United States Patent [19]

Nuytten

[11] Patent Number: 4,903,941

[45] Date of Patent: Feb. 27, 1990

[54] PRESSURE EQUALIZING ROTARY JOINT

[75] Inventor: Rene T. Nuytten, North Vancouver, Canada

[73] Assignee: International Hard Suits, Inc., North Vancouver, Canada

[21] Appl. No.: 239,117

[22] Filed: Aug. 30, 1988

[30] Foreign Application Priority Data

Sep. 4, 1987 [CA] Canada .................................. 546235

[51] Int. Cl.⁴ .............................................. F16K 51/00
[52] U.S. Cl. ...................................... 251/148; 285/95; 285/900; 277/3
[58] Field of Search ...................... 277/3, 27; 251/148; 285/95, 900; 403/162, 163, 140, 288

[56] References Cited

U.S. PATENT DOCUMENTS

| | | |
|---|---|---|
| 1,888,026 | 11/1932 | Chapman . |
| 2,557,140 | 6/1951 | Razdowitz ........................... 285/109 |
| 3,057,646 | 10/1962 | Brumagim .............................. 285/41 |
| 3,759,550 | 4/1973 | Peress .................................... 285/11 |
| 4,071,253 | 1/1978 | Heinen et al. ............................ 277/3 |
| 4,307,889 | 12/1981 | Piazza ..................................... 277/3 |
| 4,549,753 | 10/1985 | Nuytten ................................. 285/95 |
| 4,656,709 | 4/1987 | Mingers et al. ......................... 277/3 |

Primary Examiner—A. Michael Chambers
Attorney, Agent, or Firm—Baker, Maxham, Jester & Meador

[57] ABSTRACT

This invention pertains to a novel rotary joint which seeks to equalize exterior-interior pressure. This rotary joint is useful in permitting free rotary motion between two components connected by the joint in conditions where unequal pressures exist at the interior and exterior of the joint. It includes a rotary joint comprising: (a) first annular member means adapted to be connected to the end of a first tube-like object; (b) second annular member means adapted to be connected to the end of a second tube-like object; (c) intermediate member means adapted to be positioned between the first annular member means and the second annular member means and being capable of moving independently of the first and second annular member means, said intermediate member means defining a first chamber between said intermediate member and the first annular member and a second chamber between said intermediate member and said second annular member; (d) first sealing means associated with the first annular member means and the intermediate member means and adapted to seal the first chamber from the interior and exterior of the joint; (e) second sealing means associated with the second annular member means and the intermediate member means and adapted to seal the second chamber from the interior and exterior of the joint; and, (f) resilient valve means adapted to enable pressure in the first chamber and pressure in the second chamber to seek to equalize when the respective pressures are unequal.

13 Claims, 1 Drawing Sheet

PRESSURE EQUALIZING ROTARY JOINT

FIELD OF THE INVENTION

This invention pertains to a novel rotary joint which seeks to equalize exterior-interior pressure. This rotary joint is useful in permitting free rotary motion between two components connected by the joint in conditions where unequal pressures exist at the interior and exterior of the joint.

BACKGROUND OF THE INVENTION

In many applications, where there is unequal pressure on a joint, the joint tends to bind and become less susceptible to rotation. In such applications, and in deep-sea diving suits in particular, it is desirable to have joints which can readily rotate and which are capable of flexion-extension. The problem arises because as external pressure on the joints increases, as will occur for example when a diving suit is submerged to greater depths, such joints tend to experience severely increased friction. A number of joints addressing this problem have been disclosed or provided in the past. Longitudinally flexible joints have been described which utilize a fluid-filled chamber in an attempt to minimize such incretion. For example, U.S. Pat. No. 3,759,550 to Peress discloses a flexible joint having an annular, partially spherical, male member movably housed within an annular, partially spherically shaped female member. The chamber formed between the male and female members is filled with a suitable fluid. Sealing means are provided on the female member wall. Although such a configuration helps to reduce the effect of increased external pressure, such configuration suffers from several disadvantages. One is that with the piston-cylinder arrangement, the walls of the cylinder tend to distort due to high end loads and hence the walls tend to move away from the piston. This causes loss of seal, loss or oil and subsequent jamming In other words, over a period of use, a small amount of liquid from the chamber is lost, the male and female members thereby become misaligned, and both members jam when one attempts to flex the joint. Moreover, with this joint, great care must be taken to ensure that there are no small air bubbles remaining within the fluid. in the chamber. At high external pressures, the air tends to compress thereby resulting in a decrease in the volume of the chamber, with consequent misalignment of the male and female members and seizure of the joint.

Such a result can also follow where a fluid containing joint is subjected to a very high external pressure, since even liquids are compressible to some degree under high pressures. In such cases, the seals on the female member must be forced hard against the male member to prevent oil leakage into the hollow tubes connected by the joint. Such a high force is itself a source of rotational friction.

U.S. Pat. No. 3,057,646, Brumagim, describes a cooled rotary seal between a fixed pipe and a rotating pipe of a rotary kiln. The ends of the pipes are separated and a rotary seal is maintained between stator rings of bronze or carbon located around the end of the fixed pipe and rotor rings constructed of a hard material such as tungsten carbide or ceramic. These are slidable in an annular flange around the end of the rotating pipe, and are spring-urged towards the stator rings. A liquid coolant can be introduced.

Other joints have been described in the past, which utilize a fluid-filled chamber between the two sections. Such joints are disclosed, for example, in U.S. Pat. No. 2,557,140 to Razdowitz, U.S. Pat. No. 3,754,779 to Paris, U.S. Pat. No. 1,888,026 to Chapman, and U.S. Pat. No. 4,549,753 to Nuytten. Such joints, however, tend to suffer from one or more of the above difficulties or from relative complexity of or from leakage when exposed to high external pressures.

The applicant is aware of other joint constructions which are more or less pertinent to this invention. These are listed below.

| U.S. Pat. No. | Inventor |
| --- | --- |
| 1,146,781 | Bowdoin |
| 1,888,026 | Chapman |
| 1,947,657 | Peress |
| 2,279,969 | Casperson |
| 2,421,691 | Gibson, Jr. et al. |
| 2,557,140 | Razdowitz |
| 2,726,104 | Boitnott et al. |
| 3,329,967 | Martinez |
| 3,466,061 | Fonda-Bonardi |
| 3,473,832 | Kriedel, Sr. et al. |
| 3,754,779 | Peress |
| 3,759,550 | Peress |
| 3,776,578 | Jessup et al. |
| 3,826,396 | Frassica |
| 3,889,985 | Garmann |
| 3,913,951 | LeFebvre, Jr. |
| 4,101,148 | Lee |
| 4,156,530 | Rivkin et al. |

SUMMARY OF THE INVENTION

This invention is directed to a unique pressure equalizing rotary joint, a plurality of which can be used to form a flexion-extension joint. The flexion-extension joint is particularly useful in deep-sea diving. An advantage is that rotational friction of each rotary joint is not substantially increased with large increases in external pressure. The joint maintains a good seal despite large increases in pressure, yet is relatively simple to assemble.

A rotary joint comprising (a) first annular member means adapted to be connected to the end of a first tube-like object; (b) second annular member means adapted to be connected to the end of a second tube-like object; (c) intermediate member means adapted to be positioned between the first annular member means and the second annular member means and being capable of moving independently of the first and second annular member means, said intermediate member means defining a first chamber between said intermediate member and the first annular member and a second chamber between said intermediate member and said second annular member; (d) first sealing means associated with the first annular member means and the intermediate member means and adapted to seal the first chamber from the interior and exterior of the joint; (e) second sealing means associated with the second annular member means and the intermediate member means and adapted to seal the second chamber from the interior and exterior of the joint; and, (f) resilient valve means adapted to enable pressure in the first chamber and pressure in the second chamber to seek to equalize when the respective pressures are unequal.

In the rotary joint, the first sealing means may be between the first annular member means and the intermediate means and enables one member to slide relative to the other. A second sealing means may be between the second annular member means and the intermediate means and enables one member to rotate relative to the other. The rotary sealing means may be regulated by a pressure inducing resilient means.

In the rotary joint, stabilizing means may be positioned between or about the second annular member means and the intermediate member means to assist in maintaining the two members means in relative required orientation under low or negligible pressure differentials.

In the rotary joint, the sealing means may be a knife edge-resilient seat type bearing. The facing area of the first chamber and the facing area of the second chamber may be about equal.

The invention also includes a rotary joint for use in providing a rotatable seal between a high pressure environment and a low pressure environment which joint does not experience substantial increased resistance to rotational movement when high pressure is exerted on the joint, characterized by: (a) a first annular sealing member having a sealing end with an annular axially facing sealing surface portion; (b) a second annular sealing member having a sealing end with an annular axially facing sealing surface portion; (c) a central member being adapted to be concentric with and axially facing the sealing surface portion of said first sealing member, and also being adapted to be concentric with and axially facing the sealing surface portion of the second sealing member, said central member having: (i) an annular first end dimensioned with and being axially slidably receivable for the first sealing member so as to define a first sealed variable volume chamber between the central member and the annular member; and (ii) an annular second end opposite to the first end with an annular bearing member concentric with, and normally rotatably abutting the sealing surface portion so as to define a second sealed variable volume chamber between the second end and the second annular member, which second chamber is interconnected with the first chamber; and, (d) a resilient valve means which permits pressures between the first chamber and the second chamber to seek to equalize.

In the rotary joint the central member may have a first surface axially facing the sealing end of the first sealing member and a second opposite surface axially facing the sealing end of the second sealing member the total transverse area of said first surface being approximately equal to the total transverse area of the second surface. The rotary joint may additionally comprising resilient means extending between the first annular sealing member and the central member for exerting sealing pressure on the sealing surface portion. In the rotary joint, the first and second chambers may be interconnected by means of an opening through the central member.

The invention also comprises a rotary joint wherein an end of the first sealing member may be slidably mounted within an annular recess in the retaining end of said central member, the first and second chambers have the same average diameter and are interconnected by means of an opening through the central member, the sealing means between the central member and the second sealing member is rotary, the sealing surface portions of said sealing means lie in a common transverse plane, and the bearing members extend substantially perpendicular from respective sealing surface portions in the joint.

In the rotary joint, the first and second chambers and a passage through the central member may be filled with a fluid which is distinct from and sealed from fluid that may be present in the interior and the exterior of the joint.

Finally, the invention includes a rotary joint for rotatably connecting tubes in a high pressure environment, comprising relatively rotatable first and second annular members at the ends of respective tubes one of which annular members includes annular sealing members, a central member being located between the two annular members and being slidable relative to the annular members which central member and the annular members includes annular bearing portions which may be adapted to seal the respective chambers from the interior and exterior of the joint, the central member having annular surfaces facing towards the respective annular members and forming respective chambers therewith respectively, which chambers are interconnected with one another and sealed from the high pressure environment, the annular surfaces of the central member being subjected to counterbalancing opposed forces due to fluid pressure in the interconnected chambers caused by compression of the joint by high pressure environment, with the result that the sealing engagement between the annular bearing portions and the annular sealing members is maintained by the resilient member independently of changes of pressure of the environment external to the joint.

In the rotary joint, the total transverse area of one annular surface of the central member is substantially equal to the total transverse area of the other annular surface of the central member. The chambers are interconnected by an opening through the central member. In the rotary joint, the chambers are filled with oil and then sealed.

DRAWINGS

In the drawings which illustrate a specific embodiment of the invention but which are not to be construed as restricting the scope of the invention in any way:

FIG. 1 illustrates a side section view of the pressure equalizing joint.

DETAILED DESCRIPTION OF A PREFERRED EMBODIMENT OF THE INVENTION

Figure 1:
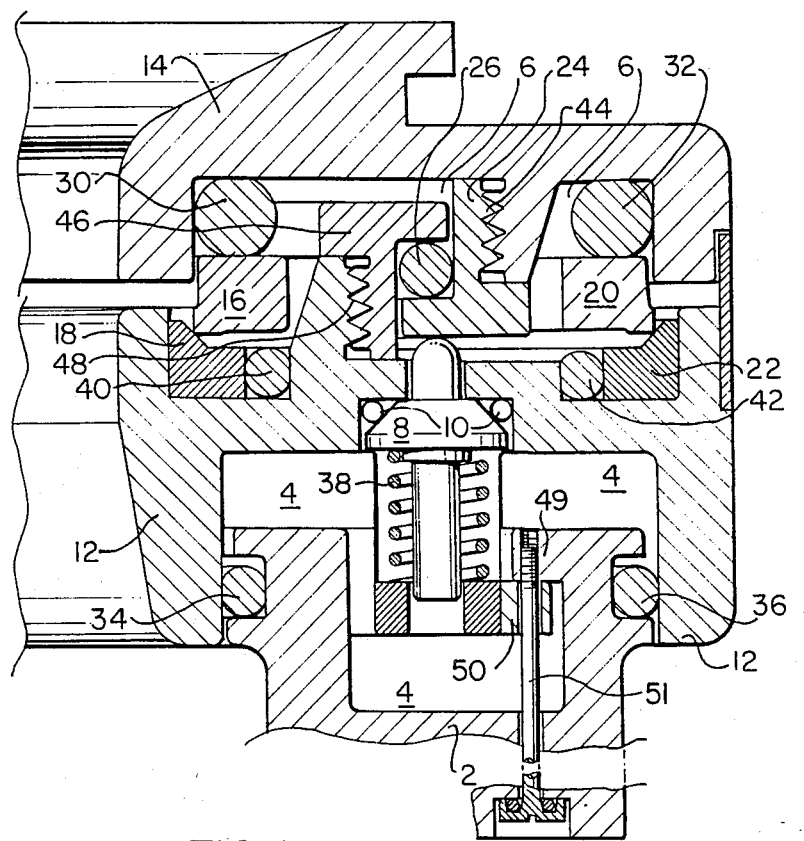

A preferred design of rotary joint is illustrated in FIG. 1 which represents a side section view of one side of the joint. While only one side is shown, it will be understood that the rotary joint is circular in construction with the various components arranged in annular pattern to one another. As seen in FIG. 1, the joint is basically constructed of a lower annular member 2, a central member 12 and an upper annular member 14. The lower member 2 and the central member 12 define a lower chamber 4. The central member 12 and the upper member 14 define an upper chamber 6. The joints between the lower member 2 and central member 12 are sealed by O-ring seals 34 and 36.

A spring loaded demand valve 8 permits oil to be transferred between the lower chamber 4 and the upper chamber 6. Spring 38 is a coil spring surrounding a portion of the valve 8 and urges it in a specified direction. Lower member 2 is slideably engaged in a receiving portion of central member 12.

The upper chamber 6 is sealed by means of inner and outer upper seals 16 and 20 and resilient inner and outer lower seals 18 and 22 respectively. Lower seals 18 and 22 are held in place relative to central member 12 by means of O-rings 40 and 42 respectively. Polymer springs 30 and 32 exert downward pressure on seals 16 and 20.

An outer retainer 24 is threadedly engaged with upper member 14 at location 44 while an inner retainer 46 is threadedly engaged with central member 12 at location 46. Retainers 24 and 46 hold between them a ball bearing 26 which enables upper member 14 and central member 12 to be maintained in relative orientation to one another, under low or negligible pressure differentials. Other devices such as a "Teflon" rod insert can be used.

The operation of the rotary joint will now be discussed with reference to FIG. 1 of the drawings. When an end-load created by high outside pressure and low inside pressure is placed on a conduit incorporating the rotary bearing, (for example, the arm of a diving suit) a load is placed on annular member 2. This load is translated into a compression force on the oil or fluid contained in lower chamber 4 and causes the pressure of the oil or fluid contained in chamber 4 to rise to a higher value than the pressure of the independent oil or fluid in upper chamber 6 by virtue of the smaller area of chamber 4.

The fluid in lower chamber 4 cannot escape into upper chamber 6 since it is prevented from doing so by demand valve 8 and its O-ring seal, 10. The end load is thus transferred through the fluid in lower chamber 4 to central member 12. From central member 12 the load is further transferred through the fluid in upper chamber 6 to upper annular member 14, which is rigidly fixed (for example, to the torso of a diving suit). As long as no fluid from chamber 6 is lost, either through seals 16 and 18 acting together in concert, or seals 20 and 22, acting together in concert, or the fluid is reduced in volume by compression of the entrained gas in the fluid, or by thermal contraction o the fluid, then the end-load (or force) will be transferred through the entire rotary bearing/seal arrangement, whilst still allowing easy rotational movement between upper members 14 and central member 12.

Should even a minute quantity of fluid be lost from lower chamber 4, however, it would have the effect of collapsing lower chamber 4 or reducing its volume, thereby causing the upper bearing edges 16 and 20 to imbed deeply into the lower deformable seals 18 and 22 which in turn results in a disadvantageous increase in friction and torque required to rotate the seal/bearing assembly. This potential embedding problem is prevented by retainer 24 which responds to any minute fluid volume reduction in upper chamber 6 by pressing on demand valve 8, thereby unseating it from O-ring seal 10 and allowing fluid to enter under pressure from chamber 4 past ball bearing 26 into chamber 6. This inlet of pressurized fluid into upper chamber 6 will urge upper members 14 and central member 12 apart, to their original positions. Retainer 24 will lift along with upper member 14 and allow demand valve 8 to reseat on O-ring seal 10.

In the original Nuytten rotary bearing design, (see FIG. 2, Canadian Patent No. 1,171,601), the concept was to equalize the areas of chamber (24) (with seals (44) and (46)) and chamber (48) to control the degree of chamber volume reduction under conditions of end-load (or thrust) and urge the sealing members apart with the same force as the end load urges them together. To be effective, this concept assumes that the chambers and seals have the same areas, as described in the disclosure of that patent at page 4, lines 10 through 25.

The improved design of the subject invention does not rely on identical areas in the seals or chambers. The lower chamber 4 acts as a reservoir of fluid under pressure (brought about by the end-load on the slideable piston-like lower member 2). The demand valve assembly 8 acts through displacement by retainer 10 to provide a controlled flow of pressurized fluid into upper chamber 6. Since the effective force translational area of lower chamber 4 is smaller than the effective force translational area of upper chamber 6, the pressure in lower chamber 4 will always be proportionately higher than the pressure in upper chamber 6. When upper chamber 6 demands fluid by reason of fluid escape or volume reduction, it receives it automatically through demand valve 8 to whatever pressure is required to urge central member 12 and upper member 14 apart to their original positions whereupon demand valve 8 closes and the rotary joint assembly is thus equalized to end-load.

It can be seen that rather than representing a modification of the joint disclosed and claimed in Canadian Patent No. 1,171,601, the design of the subject invention uses a principle or action opposite to that contemplated in that patent.

As can be visualized by following the sequence through FIG. 1 of the drawings, fluid losses or volume reduction will continue to be made up from lower chamber 4 until the top surface of the annular piston member 2 "tops or bottoms out" by contacting the corresponding facing surface of central member 12.

In the joint design in Canadian Patent No. 1,171,601, there is no demand valve 8. Fluid is transferred through transfer hole (50) to chamber (48) from chamber (24). If chamber (24) is smaller than chamber (48), the resulting increase in pressure in chamber (48) will lift member (44) and all fluid would then be instantly lost. From the foregoing, it can be appreciated that the pressures within the chambers of Patent No. 1,171,601 are, by necessity, fixed, relative to the end load. In the new subject joint design, the pressures within the chambers 4 and 6 are variable and are controlled by demand valve 8.

There are additional variations between the subject joint design and the joint that is disclosed and claimed in Patent No. 1,171,601. In Patent No. 1,171,601, the bearing seal assembly is held together by an outside collar (60). In the design of subject invention, the entire assembly is held together by internal threaded restraint members 28 and 30 which capture, between them, a ball bearing set 26. The ball bearings 26 allow rotation under all conditions, that is even when the conduit is not under pressure (for example, when the diving suit is on the surface).

A second distinction is that the parabolic section piston/knife edges (30) and (46) that are used in Patent No. 1,171,601 are not used in the subject design. It has been found to be difficult to construct the knife edge/piston (30) in one piece because the areas of contact of edges (44) and (46) are different, by virtue of their different diameters. With a fixed piston and a single row of springs (52), the fixed pressure exerted by the pre-load springs (52) was found to be higher on the inside edge (46) than the outside edge (44) of the joint. For this reason, the bearing fluid cannot be retained under a given end-load unless the total spring load exceeds the pressure required to seal the outside edge (44). This results in a very high pre-load force on the inner edge (46) with an increase in the rotational torque/friction beyond acceptable levels. The joint design of the invention has no piston corresponding to the central member (30) described in U.S. Pat. No. 1,171,601. The subject joint design has inner and outer knife edge seals 16 and 20, each bearing on its upper surface (as seen in FIG. 1) against its own "polymer spring", 30 and 32 respectively. The pre-load pressure required to imbed seals 16 and 20 respectively into the deformable lower seals 18 and 22 can be varied by the use of different durometer hardnesses in the polymer springs 30 and 32, on different thicknesses.

The polymer springs 30 and 32 not only serve to provide a predetermined spring action but they also act as diaphragms which seal the tops of the knife edges 16 and 20 to the annular side walls and top of upper member 14. By using the same thickness or hardness for both polymer springs 30 and 32, the "O-ring" force applied per running inch of diameter of edges of seals 16 and 20 are the same, even though they are of different diameters.

A further distinction between the joint of U.S. Pat. No. 1,171,601 and the joint of this invention is that in addition to acting as a make-up piston, lower member 4 and its associated cylinder (central member 12) cooperate to function as a flexion joint which allows a certain acceptable degree of bias deflection off the central axis of the rotary seal. Thus, a number or series of such bearing assemblies, acting in concert in a conduit (for example, in the limb of an atmospheric diving suit) will allow a significant degree of total off-centre deflection to occur as created, by the sum of the rocking of each lower reservoir piston (member 2). This gives greater total dexterity and movement in an overall conduit than is possible with the sole use of wedge-shaped spacers as contemplated in the joint design that is disclosed and claimed in Patent No. 1,171,601 (see FIG. 3).

The degree of deflection off the central axis in the subject joint is diameter sensitive and varies from approximately 1.5 to 3 degrees with an average of approximately 2.5 degrees. Thus due to diameter a conduit having a series of seven joints will exhibit on average a total of 18 degrees of "bend" in addition to the large degree of flexion that is provided by the cumulative total of the rotary bearings.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A rotary joint comprising:
    (a) first annular member means adapted to be connected to the end of a first tube-like object;
    (b) second annular member means adapted to be connected to the end of a second tube-like object;
    (c) intermediate member means adapted to be positioned between the first annular member means and the second annular member means and being capable of moving independently of the first and second annular member means, said intermediate member means defining a first chamber between said intermediate member and the first annular member and a second chamber between said intermediate member and said second annular member;
    (d) first sealing means associated with the first annular member means and the intermediate member means and adapted to seal the first chamber from the interior and exterior of the joint;
    (e) second sealing means associated with the second annular member means and the intermediate member means and adapted to seal the second chamber from the interior and exterior of the joint; and,
    (f) resilient valve means adapted to enable pressure in the first chamber and pressure in the second chamber to equalize when the respective pressures are unequal.

2. A rotary joint as defined in claim 1 wherein the first sealing means is between the first annular member means and the intermediate means and enables one member to slide relative to the other.

3. A rotary joint as defined in claim 1 wherein the second sealing means is between the second annular member means and the intermediate means and enables one member to rotate relative to the other.

4. A rotary joint as defined in claim 3 wherein the rotary sealing means is regulated by a pressure inducing resilient means.

5. A rotary joint as defined in claim 4 wherein stabilizing means are positioned between or about the second annular member means and the intermediate member means to assist in maintaining the two member means in relative orientation under low or negligible pressure differentials.

6. A rotary joint as defined in claim 5 wherein the sealing means is a knife edge-resilient seat type bearing.

7. A rotary joint as defined in claim 1 wherein the facing area of the first chamber and the facing area of the second chamber is about equal.

8. A rotary joint for use in providing a rotatable seal between a high pressure environment and a low pressure environment which joint does not experience substantial increased resistance to rotational movement when high pressure is exerted on the joint, characterized by:
    (a) a first annular sealing member having a sealing end with an annular axially facing sealing surface portion;
    (b) a second annular sealing member having a sealing end with an annular axially facing sealing surface portion;
    (c) a central member being adapted to be concentric with and axially facing the sealing surface portion of said first sealing member, and also being adapted to be concentric with and axially facing the sealing surface portion of the second sealing member, said central member having:
        (i) an annular first end dimensioned with and being axially slidably receivable for the first sealing member so as to define a first sealed variable volume chamber between the central member and the annular member; and
        (ii) an annular second end opposite to the first end with an annular bearing member concentric with, and normally rotatably abutting the sealing surface portion so as to define a second sealed variable volume chamber between the second end and the second annular member, which second chamber is interconnected with the first chamber; and,
    (d) a resilient valve means which permits pressures between the first chamber and the second chamber to seek to be equalized.

9. A rotary joint as described in claim 8 wherein the central member has a first surface axially facing the sealing end of the first sealing member and a second opposite surface axially facing the sealing end/of the second sealing member the total transverse area of said first surface being approximately equal to the total transverse area of the second surface.

10. A rotary joint as described in claim 8 additionally comprising resilient means extending between the first annular sealing member and the central member for exerting sealing pressure on the sealing surface portion.

11. A rotary joint as described in claim 8, 9 or 10 wherein the first and second chambers are interconnected by means of an opening through the central member.

12. A rotary joint as described in claim 8, 9 or 10 wherein an and of the first sealing member is slidably mounted within an annular recess in the retaining end of said central member, the first and second chambers have the same average diameter and are interconnected by means of an opening through the central member, the sealing means between the central member and the second sealing member is rotary, the sealing surface portions of said sealing means lie in a common transverse plane, and the bearing members extend substantially perpendicular from respective sealing surface portions in the joint.

13. A rotary joint as described in claim 8, 9 or 10 wherein the first and second chambers and a passage through the central member are filled with a fluid which is distinct from and sealed from fluid that may be present in the interior and the exterior of the joint.

* * * * *